United States Patent [19]

Martin

[11] Patent Number: 4,697,464

[45] Date of Patent: Oct. 6, 1987

[54] PRESSURE WASHER SYSTEMS ANALYZER

[76] Inventor: Thomas E. Martin, 2208 36th St., Evans, Colo. 80620

[21] Appl. No.: 921,693

[22] Filed: Oct. 20, 1986

Related U.S. Application Data

[63] Continuation-in-part of Ser. No. 852,637, Apr. 16, 1986.

[51] Int. Cl.[4] .......... G01M 19/00

[52] U.S. Cl. .......... 73/866.3; 73/714; 73/168; 374/142

[58] Field of Search .......... 73/112, 115, 168, 866.3, 73/714; 239/124, 125, 126, 127, 128, 135, 129, 71; 374/142

[56] References Cited

U.S. PATENT DOCUMENTS

| | | | |
|---|---|---|---|
| 2,723,559 | 11/1955 | Germer | 73/112 |
| 3,146,950 | 9/1964 | Lancaster | 239/128 |
| 3,263,932 | 8/1966 | Ruland | 239/128 |
| 3,341,081 | 9/1967 | King | 239/129 |
| 3,814,321 | 6/1974 | Mulholland et al. | 239/135 |
| 3,857,282 | 12/1974 | Doorley et al. | 73/168 |
| 4,203,321 | 5/1980 | Vyse et al. | 73/168 |
| 4,296,727 | 10/1981 | Bryan | 73/112 |
| 4,380,166 | 4/1983 | Crombie | 73/168 |
| 4,423,487 | 12/1983 | Buckenham et al. | 73/112 |
| 4,530,463 | 7/1985 | Hiniker et al. | 239/71 |

FOREIGN PATENT DOCUMENTS

| | | | |
|---|---|---|---|
| 81184 | 5/1982 | Japan | 73/112 |

*Primary Examiner*—Stewart J. Levy
*Assistant Examiner*—Robert R. Raevis
*Attorney, Agent, or Firm*—Dean P. Edmundson

[57] ABSTRACT

Apparatus is described which is adapted to analyze various operating conditions and characteristics of steam cleaners and pressure washer (e.g., of the type which heats water and forces it out of a nozzle under pressure). The test apparatus includes means for testing and analyzing operating characteristics and parameters such as inlet and outlet water temperature, water pump head pressure, coil outlet pressure, fuel pressure, water flow rate, voltage and electrical current draw, stack temperature, and hydrocarbon emissions. The test apparatus is useful in servicing pressure washers and in comparing the operation of one pressure washer to another pressure washer. The test apparatus is also very useful in detecting possible safety hazards existing in steam cleaners and pressure washer.

13 Claims, 6 Drawing Figures

PRESSURE WASHER OR STEAM CLEANER

FIG. 3
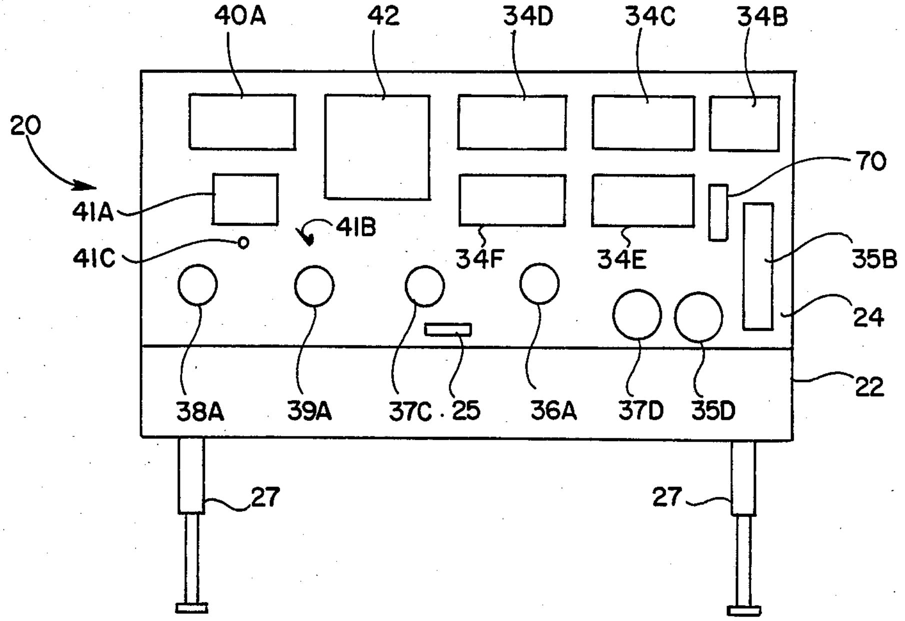
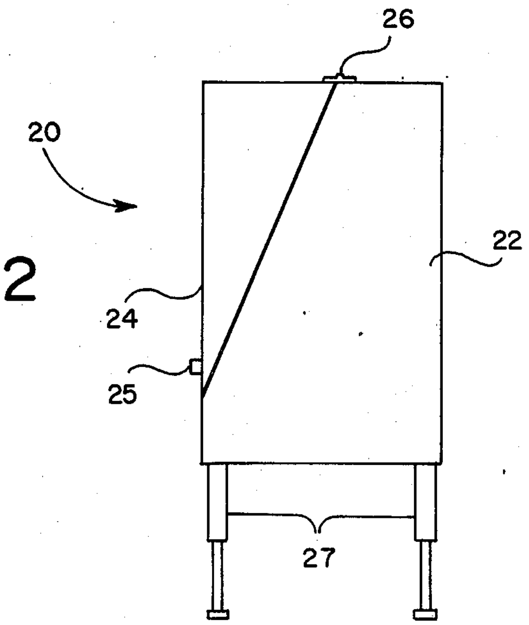
FIG. 2

PRESSURE WASHER OR STEAM CLEANER

PRESSURE WASHER SYSTEMS ANALYZER

CROSS-REFERENCE TO RELATED APPLICATION

This application is a continuation-in-part of my co-pending application Ser. No. 852,637 filed Apr. 16, 1986.

FIELD OF THE INVENTION

This invention relates to steam cleaners and hot and cold water pressure washers of the type in which hot or cold water is forced through an exit nozzle under pressure. More particularly, this invention relates to apparatus and systems (including gauges and meters) required for measuring and analyzing various operating parameters of steam cleaners and pressure washers.

BACKGROUND OF THE INVENTION

Over the past few years a wide variety of styles and configurations of steam cleaners and pressure washers have been introduced onto the market. Basically, these pressure washers are all adapted to force water out of an exit nozzle under pressure. Such steam cleaners and pressure washers are used for various purposes, such as cleaning vehicles, heavy equipment, buildings, food preparation equipment (e.g., kettles, cutting instruments), etc. Some of such steam cleaners and pressure washers are adapted to heat the water to 210 degrees, some to 325 degrees, and some to higher temperatures, before it is forced out of the nozzle, while other such washers are adapted to force the water out of the nozzle without heating.

The water is heated by forcing it (e.g., by a pump) through a coiled tube. Coils are designed to help form a combustion chamber and to let the exhaust gases escape out of the stack. Coils are usually made of steel pipe welded together or they may be made of continuous tubing. The greater the number of wraps and the number of feet in the coil, the greater the extent to which the water is heated in the coils, for a given burner.

The heating of water in the coiled pipe can cause the interior surface of the pipe to rust and, in hard water areas of the country, heating of the water in the coils can cook the minerals out of the water. As a result, the minerals may be caused to stick to the interior surface of the coiled pipe (e.g., resulting in a lime build-up in the pipe). Some types of soap and chemicals can cause the same type of problem, creating a coating or scale on the interior surface of the pipe in the coil.

Lime or chemical deposits in the coiled pipe will cause a decrease in the water flow through the pipe, reduce the outlet temperature and pressure of water from the coil, and may eventually plug the coil. Restriction in the coil, whether by lime build-up or other chemical deposition, will cause the water pump outlet pressure to be higher than the outlet pressure from the coil (e.g., by as much as 350 psi or more).

The burner used to heat the water may burn fuel oil or LP or natural gas. The more water that is forced through the coil, the more heat or BTUs it takes to heat the water. Some coils which are 105 feet long will heat 2 gallon per minute (gpm) of water up to 325° F. and burn 1.25 to 1.5 gallons per hour of fuel. Some steam cleaners and hot pressure washers with a 105 feet coil can heat 4 gallons per minute of water to 160° F. and burn 4.75 gallons of fuel per hour.

If the burner fails to light, the combustion chamber can fill with fuel oil or gas and possibly explode. Poor grades of fuel oil or inadequate combustion air can cause heavy soot build-up on the outer surface of the heating coil. It will restrict air flow through the coil and out of the stack, further aggravating the soot build-up.

Steam cleaners and hot water pressure washers are commercially available with a vertical or a horizontal fired heater, having various capacities, i.e., some washers are capable of heating and supplying water at a rate of about two gallons per minute, while other washers may be capable of heating and supplying water at a rate of ten gallons per minute or more (e.g., 30 gallons per minute). In other words, some steam cleaners and pressure washers consume more power and burn more fuel than others.

Some high pressure washers and steam cleaners utilize gasoline or diesel engines as a power source. For example, the gasoline or diesel engine may power a generator to provide electrical power for the pressure washer, or the engine may power the water pump directly, or the engine may power both the generator and the water pump. The more water being forced through the washer, and the greater the pressure of the water exiting the washer, the larger the water pump, the electric motor, or gasoline or diesel engine which is required. Failing to use a larger pump or motor may result in the motor pump, and electric system being overloaded.

The electrical system of a steam cleaner or pressure washer includes an electrical power cord to manual on-off switches to the electric motor (if used), from manual on-off switch to burner assembly on-off switch, then through the burner assembly (either fuel oil or LP or natural gas), through a thermostat switch (if used), then through a flow, vacuum, or pressure switch (if used); and sometimes a stepdown transformer is used (e.g., 440 volts to 220 volts, etc.)

Most pressure washers which use a trigger control gun include a bypass or unloader valve adapted to bypass water back into the water pump inlet when the trigger is in a closed position (to shut off the water from the exit nozzle). This causes a flow, vacuum, or pressure switch to sense that there is no water flow or pressure, and consequently an electric switch is opened to turn off the burner assembly or fuel solenoid valve (if used) on the fuel pump. Some pressure washers wire flow or pressure switches to turn the water pump motor and burner assembly off, but if there is a leak in a pressure hose to the exit nozzle, the pressure washer will come on by itself.

The power cord on a steam cleaner or pressure washer is usually adapted for 120 volt or 240 volt, single phase 10/3 to 18/3. The first numbers denote the gauge of wire (the larger the number, the smaller the wire). The last number denotes the amount of wire in the cord. In power cords having three wires the wires are green, black and white, respectively. For 3 phase power cord, it also has red (i.e., 10/4 etc.) and is from four inches long to five feet long. Most steam cleaners or pressure washers have only a short lead-in cord. Consequently, when using such devices it is necessary to use an extension cord to connect to the lead-in cord. If the lead-in cord is sufficiently long to reach the floor, and if there is water on the floor, it is possible that the lead-in cord could lay in the water and cause an electrical shock.

The burner assembly has an electrical blower motor and a transformer which converts 120 volt or 240 volt primary voltage to 10,000 volts (secondary voltage), wired parallel together and into a series with a thermostat, flow or pressure switch, and an on-off switch. If a fuel solenoid valve is used, it is wired in series with the thermostat, flow or pressure switch back to the burner switch, blower motor and transformer; then it is wired back to a manual on-off switch, blower motor and transformer; then it is wired back to a manual on-off switch. The blower motor turns the fan (to provide air for the combustion chamber) and powers the fuel pump. The transformer is adapted to connect to electrodes by a buss bar, appropriately adjusted so that electricity arcs across the electrode tips and thereby lights fuel in the chamber. An LP or natural gas assembly is wired in series with a temperature flow pressure switch to a gas valve or safety regulator.

In those steam cleaners or pressure washers with a thermostat, the thermostat also can turn off the on-off switch for the burner assembly or fuel solenoid valve. Some thermostats are non-adjustable (i.e., pre-set by manufacturer). Some are adjustable and include a dial to set the water outlet temperature. Some steam cleaners or pressure washers use thermostats that have a sensor bulb in the coil outlet water line and are connected to an electric automatic on-off switch, while others have automatic on-off switches connected to sensors which are attached to the coil outlet pipe. When a flow or vacuum switch is used, water flows through a housing assembly connected to an electric switch; this apparatus is adapted to shut off the inlet water. When a pressure switch is used, an electric on-off switch is contained in a housing installed between the water pump outlet and the by-pass or unloader valve.

A few steam cleaners and pressure-washers use electronic controls which regulate temperature, flow or pressure switch, or fuel solenoid, etc. to turn the burners off automatically.

Those steam cleaners and pressure washers which use a straight through gun-wand assembly don't have a trigger gun, or flow or pressure switches, or by-pass valves, etc. Cold water pressure washers don't use heating coils, thermostats, flow or pressure switches, etc.

Some steam cleaners or pressure washers use safety controls, such as trigger control guns, or pop-off or relief valves which are set to relieve water or steam into the atmosphere or into a float tank at a pre-set pressure or temperature. Some steam cleaners or pressure washers use a float tank between the water inlet and the water pump. A few steam cleaners use a lead melt-out device which melts if the water gets too hot or has too much pressure. Steam cleaners heat the water to create pressurized steam, and hot water pressure washers heat water under pressure.

It has been found that some pressure washers and steam cleaners are more efficient than others. It has also been found that some pressure washers and steam cleaners emit more hydrocarbons than others, i.e., some combustion heaters burn more efficiently than others. Other operating parameters also vary from one type of steam cleaner or pressure-washer to another, with many different styles and configurations and a variance in the quality of components (motors, pumps, switches, unloader valves, etc.) used in the manufacture of such equipment.

Unfortunately, there has not heretofore been provided any convenient and reliable means to analyze the operating parameters of various pressure washers. Consequently, it has been difficult to analyze all of the operating parameters of a particular pressure washer, and it has been even more difficult to analyze and compare operating parameters of competitive pressure washers. Although there have been a variety of various hand-held gauges or meters available (e.g., voltmeters, pressure gauges, etc.) for measuring a specific parameter, such individual gauges or meters are rather inconvenient and time consuming to use while attempting adjustments to the apparatus. Moreover, the use of a single measuring instrument at a time is not a reliable way to analyze all of the operating parameters of such apparatus. Furthermore, it is not possible to simultaneously measure or analyze all of the operating parameters of such apparatus under varying conditions using hand-held individual gauges or meters.

Consequently, it has been extremely difficult for service repairmen and manufacturers to accurately and efficiently analyze all of the operating parameters of a particular steam cleaner or pressure washer. Yet, without an accurate analysis of such operating parameters, it is very difficult for a repairman to make correct repairs or adjustments to a piece of this equipment, and it has been even more difficult to analyze and compare operating parameters of competitive steam cleaners or pressure washers. Of course, it has also been impossible to set meaningful standards for the design and manufacture of this type of equipment.

SUMMARY OF THE INVENTION

In accordance with the present invention there are provided systems and apparatus for testing, analyzing and diagnosing the operational parameters or conventional pressure washers. The term "pressure washer" as used herein is meant to include both hot water and cold water pressure washers and also includes what is known in the field as steam cleaners (since steam cleaners include the same basic construction as a pressure washer except that the water is converted to steam before exiting the apparatus).

In one embodiment there is provided a self-contained, portable test panel which is adapted to be quickly and easily operably connected to a conventional pressure washer of the type including an exit nozzle for pressurized water (either as liquid or as steam vapor), a water pump (which may be powered by an electric motor or a gasoline or diesel engine), and optional heater means for heating water. A preferred test panel comprises:

(a) voltage monitor means adapted to measure electrical line voltage to and throughout, the pressure washer apparatus;

(b) electrical current measurement means adapted to measure current draw throughout the pressure washer apparatus;

(c) temperature sensing means adapted to monitor the temperature of water exiting the nozzle or the coil outlet;

(d) pressure sensing means adapted to monitor the pressure of water exiting the nozzle; and (e) short circuit test means adapted to detect the presence of electrical short circuits in the pressure washer through the ground wire.

Optionally, the test panel also includes:

(1) temperature sensing means adapted to monitor the temperature of water entering the water pump and coil;

(2) pressure sensing means adapted to monitor water pressure at the water pump outlet;

(3) fuel pressure sensing means adapted to measure the pressure of the fuel at the pump; or fuel pressure means adapted to measure the pressure of LP or natural gas;

(4) flow meter means adapted to measure the flow rate of water pumped by the pressure washer;

(5) flow meter means adapted to measure the rate of chemicals or soap pumped by the pressure washer;

(6) hydrocarbon test means adapted to measure the air-to-fuel ratio, carbon monoxide percentage, percentage of fuel burned, etc., which is emitted from the combustion chamber;

(7) temperature-sensing means adapted to measure the temperature of the gases emitted from the heater combustion chamber; and (8) ohm-volt meter means adapted to test for electrical continuity or voltage at different points in the electrical system of the apparatus.

The apparatus and systems of the invention provide the capability of simultaneous testing and measurement of all operating parameters and characateristics of a pressure washer. This allows the diagnosis of the operation of a pressure washer, e.g., to facilitate servicing, to determine relative efficiencies of various pressure washers, to determine whether safety hazards exist (such as high readings in stack gases and temperature, overloads and electrical shorts or hot wire to ground), and to determine how changes in certain operating parameters affect other operating parameters (e.g., by changing fuel pressure, water pressure, coil size, altitude, etc.).

The apparatus and systems of the invention are convenient and easy to use on any brand or model of pressure washing apparatus. The invention is very useful in service repairing operations, in determining whether safety hazards exist with respect to any particular pressure washer, and in establishing standards for such apparatus and equipment in the industry.

The self-contained, portable test panel of the invention may be transported to any desired location for use. Thus, there is no need to transport the pressure washer to any particular location for testing. This is especially helpful for service repair capabilities.

BRIEF DESCRIPTION OF THE DRAWINGS

The invention is described in more detail hereinafter with reference to the accompanying drawings wherein like reference characters refer to the same parts throughout the several views and in which:

FIG. 2 is a side elevational view of another embodiment of apparatus of the invention;

FIG. 3 is a front elevational view of the apparatus of FIG. 2; and

DETAILED DESCRIPTION OF THE INVENTION

Figure 1:
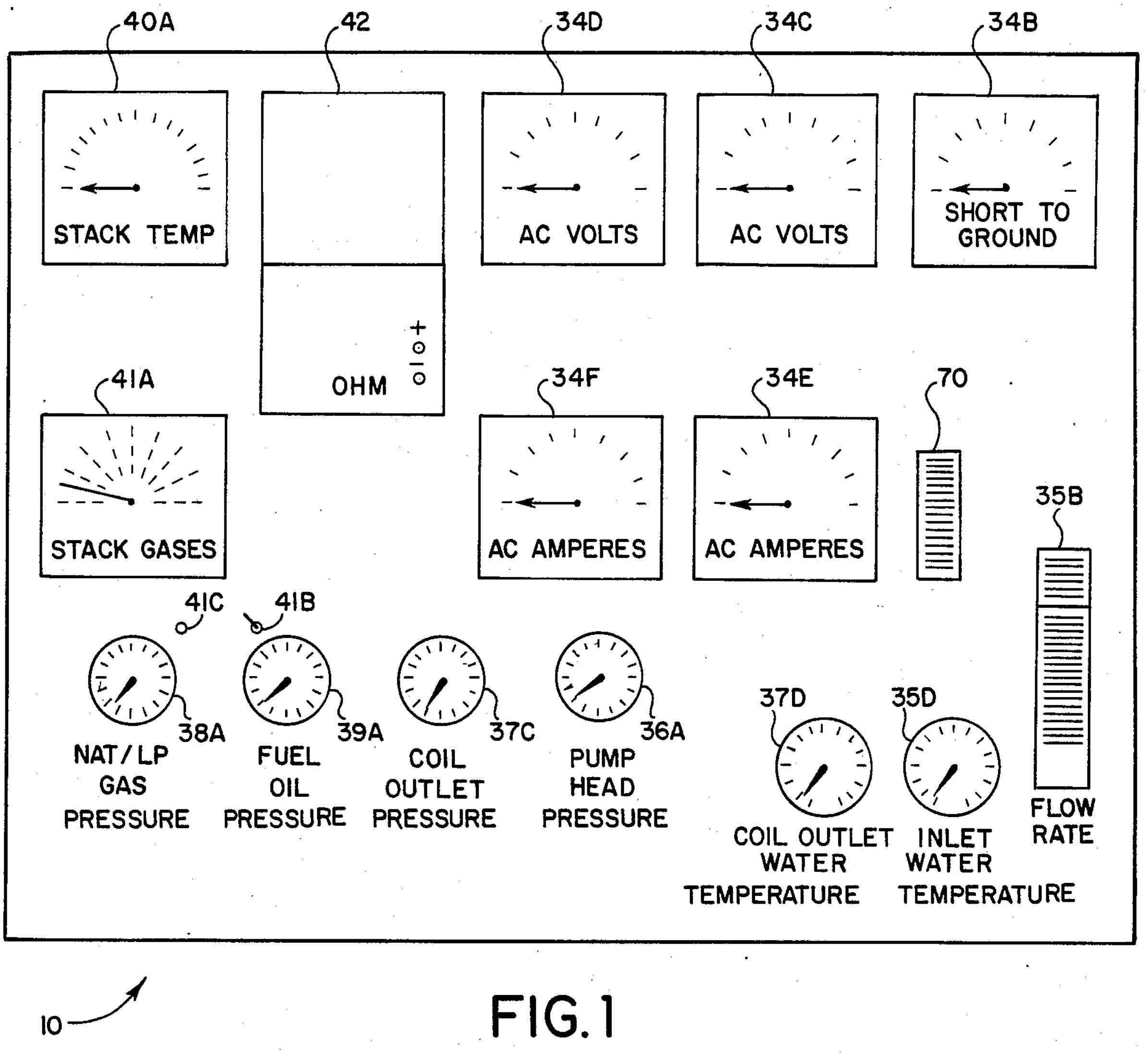
FIG. 1 is a front elevational view of one embodiment of a self-contained, portable test panel of the invention.

In FIG. 1 there is shown a front elevational view of one embodiment of test panel 10 of the invention. In this test panel there are a variety of gauges to indicate various operating parameters of a pressure washer. Thus, the test panel is capable of simultaneously measuring and displaying a wide variety of operating features of a pressure washer. These operating features include: voltage in the electrical system (gauges 34C and 34D), current draw by the electrical system (gauges 34E and 34F), presence of any short circuits (gauge 34B), temperature of the stack gases (gauge 40A) from the combustion heater; the air to fuel ratio, percentage of fuel burned, carbon monoxide percentage in the stack gases (gauge 41A) the flow rate of water through the pressure washer (gauge 35B), the inlet water temperature (gauge 35D), the outlet water temperature (gauge 37D), the outlet water pressure (gauge 37C), the water pump outlet pressure (gauge 36A), and the fuel pump pressure (gauge 39A, where oil is the fuel) or gas pressure (gauge 38A, where gas is the fuel).

Thus, with this test panel operably connected to a pressure washer it is possible to measure and observe all of the operating parameters of the pressure washer simultaneously. Use of the test panel enables analysis of the operating parameters of the washer. Some of such operating parameters include: (a) safety hazards (e.g., high readings in stack gases or temperature, overloads and electrical short circuits to ground); and (b) operating efficiency. Analysis of the operating parameters of the washer also assists the service repairman in conducting accurage trouble-shooting of the operation of the washer.

Some pressure washers may have improper or inadequate electrical wiring (such as electrical components not being grounded, wires being light-duty, or switches being light-duty). As a result, such pressure washers may present serious safety hazards when used (e.g., electrical wires or switches being too small, resulting in higher ampere draw); also, electrical overloads could cause the wires to burn out. The test panel of the present invention allows diagnosis of pressure washers so that the existence of safety hazards can be determined before serious injuries result from use of such pressure washers.

In FIGS. 2 and 3 there are shown elevational side and front views, respectively, of another embodiment of self-contained test panel apparatus 20 of the invention. In this embodiment the test panel is contained in an enclosure 22 having cover 24 (which may be transparent or opaque) which is hinged at the top with hinge 26. Handle 25 on the front of cover 24 facilitates lifting of the cover 24, as desired. Telescoping legs 27 are secured to the bottom of the enclosure 22. If desired, wheels may be included on the bottom of each leg. The enclosure is preferably made of plastic or other non-conductive material.

Figure 4:
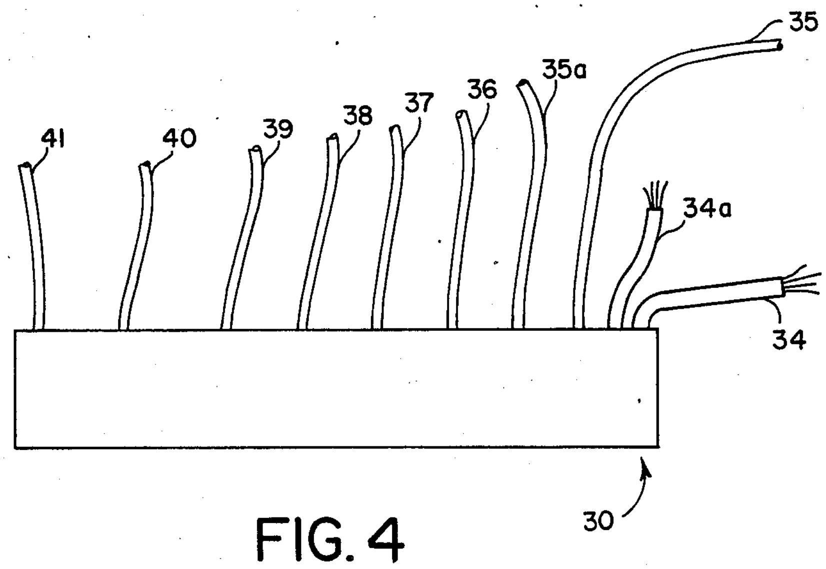
FIG. 4 is a top view of another embodiment of test panel of this invention showing the various lines which connect between the test panel and a pressure washer.

In FIG. 4 there is shown a top view of another embodiment of self-contained, portable test panel 30 of the invention. A plurality of gauges or other display means (not shown) are contained in housing or enclosures 2. Power cord 34 is adapted to be connected to a power source (e.g., 110 volt, or 220 volt, or 440 volt outlet). The power cord enters the test panel and is connected to the various gauges and meters in the panel which measure voltage and current draw. The power cord **34*a*** then extends from the test panel to the pressure washer. In other words, the electrical power from the source proceeds first to the test panel, then through the test panel, and then to the pressure washer. The test gauges preferably are adapted to monitor all phases of a multiphase electrical power source.

Figure 5:
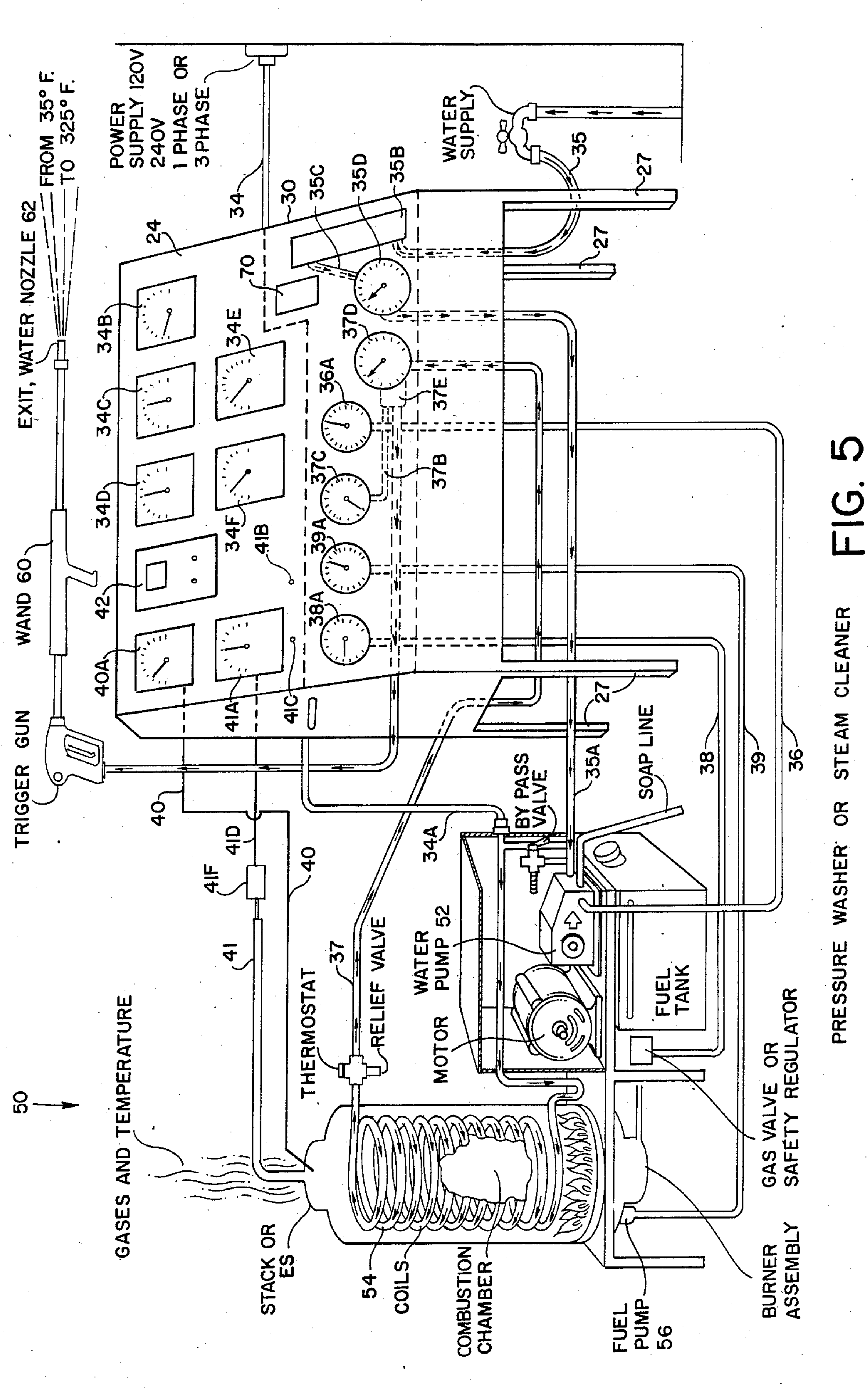
FIG. 5 shows a test panel of this invention operably connected to a conventional pressure washer.

FIG. 5 illustrates the manner in which the test panel 30 is operably connected to pressure washer apparatus 50.

The water line 35 is connected to the water supply source. Then water passes into the test panel and then out through manifold 35C and then line **35*a* to the pressure washer where it is connected to water pump 52. In the test panel there are gauges for water flow rate (gauge 35B), water temperature (gauge 35D), etc. The manifold 35C houses the sensor for the inlet water temperature gauge 35D**.

High pressure hose 36 is connected to the outlet pressure port of the water pump 52 of the pressure washer and is also connected to a pressure gauge 36A in test panel 30. High pressure hose 37 is connected at one end to the water line at the heated coil outlet in the pressure washer and is connected at its other end to a pressure manifold 37E which houses the sensor for the outlet water temperature gauge 37D. High pressure hose 37B connects pressure gauge 37C to manifold 37E (which could house a sensor for remote reading, e.g., chart recorder or computers). High pressure hose 37A connects between the high pressure manifold 37E and the wand 60.

In other words, the water enters the test panel 30 by hose 35 and then flows through flow meter 35B and manifold 35C to the pressure washer 50. Then it is pumped through the heating coil 54 and back to the test panel through line 37, through manifold 37E, and then out of the test panel to the wand 60 through hose 37A. Wand 60 includes exit nozzle 61.

High pressure hose 38 is connected at one end to the gas valve pressure port (if gas is used as a fuel) and is connected at its other end to a pressure gauge 38A in test panel 30.

High pressure hose 39 is connected at one end to the pressure port on fuel pump 56 (if liquid fuel such as oil or kerosene is used) and is connected at its other end to a pressure gauge 39A in the test panel. Cable 40 is connected at one end to the stack or exhaust system of the pressure washer and is connected at its other end to a temperature gauge 40A in the test panel. Cable 41 is connected at one end to the stack or exhaust of the pressure washer and is connected at its other end to sensor 41F, which in turn is connected to hydrocarbon emissions gauge 41A in the test panel. Emissions gauge 41A may be powered by a battery pack connected through wire 41D and switch 41B to emissions gauge 41A. Dial 41C may be used to adjust the emissions gauge 41A, as required for example to zero it.

Ohm-volt meter 42 is used to spot check for electrical continuity or voltage (e.g., at the thermostat, if present; at the burner motor; at the gas valve or regulator; at on-off switches; at electronic controls, etc.).

Figure 6:
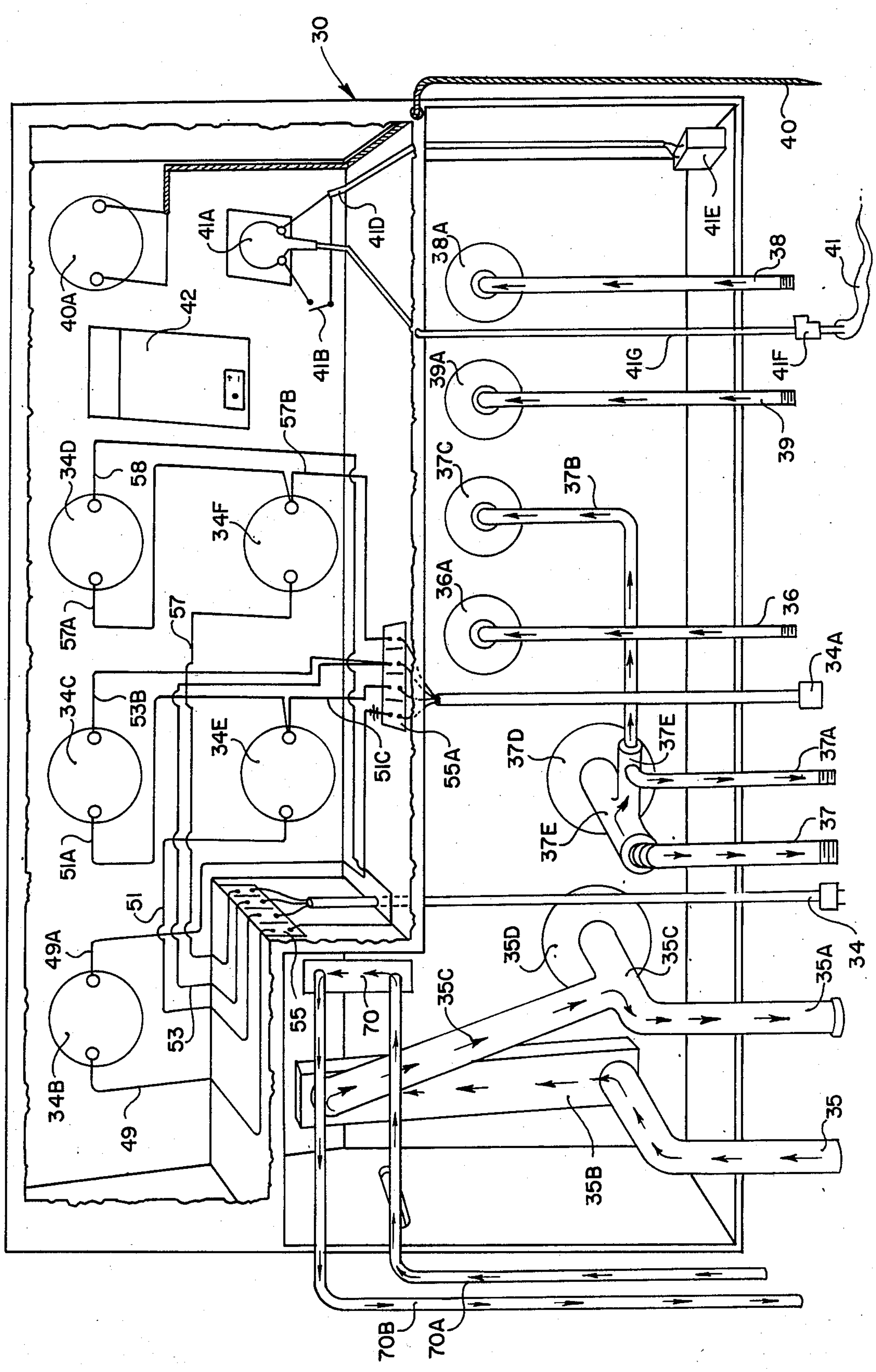
FIG. 6 is a rear elevational view of a test panel of this invention.

FIG. 6 is a rear elevational view of the embodiment of test panel 30 illustrated in FIG. 5. In this view a battery pack 41E is visible which is connected to emissions gauge 41A with wire 41D, through switch 41B. Cable 41 is shown connected to sensor 41F which in turn is connected by wires 41G to gauge 41A. Also visible in this view is a flow meter 70 (e.g., for measuring flow of chemical or soap solution being adding to the water) which is connected between hose 70A (inlet or supply hose which is in communication with the desired source of chemical or soap solution) and hose 70B which proceeds to the water pump inlet or port. If the pressure washer apparatus includes a soap metering valve, hose 70B connects to such valve. Flow meter 70 is used in conjunction with water flow meter 35B to determine the ratio of chemical or soap to the amount of water being used.

Chemicals such as hydrochloric acid (muriatic acid) are used for purposes such as cleaning masonry, bricks, etc. Some chemicals which may be used can be hazardous to health and the environment and therefore must be used strictly according to the manufacturer's instructions.

FIG. 6 also illustrates the manner in which the gauges in the test panel are wired. Thus, there is shown power cord 34 which is adapted to be connected to the power source (e.g., 110 volts, or 220, or 440 volts or any other such power source). A one or three phase power outlet may be used, with 15–50 amp fuse boxes.

The power cord enters the test panel and is connected to the electrical connection block 55. Green wire 49 is connected between block 55 and gauge 34B. Wire 49A connects between the opposite side of gauge 34B and block 55. Black wire 51 is connected between block 55 and amp gauge 34E. From the opposite side of gauge 34E one wire 51C connects to electrical wiring block 55A; another wire 51A connects from gauge 34E to volt gauge 34C. Wire 53B connects from the other side of gauge 34C to block 55A.

White wire 53 is connected between block 55 and block 55A. Red wire 57 is connected between block 55 and gauge 34F; from the opposite side of gauge 34F one wire 57B proceeds to block 55A while another wire 57A proceeds to gauge 34D. From the opposite side of gauge 34D wire 58 extends to block 55.

The power cord 34A connected to block 55A exits from test panel 30 and connects to the pressure washer apparatus. Electrical connection blocks 55 and 55A include connections for the green, black, white and red wires carried by power cords 34 and 34A. In other words, the electrical power from the supply power source proceeds first to the test panel 30, then through the appropriate gauges in the test panel, and then to the pressure washer. The test gauges preferably are adapted to monitor one and three phase electrical power (any AC voltage and ampere draw).

The gauges in the test panel may be any conventional analog or digital gauges. If desired, a chart recorder or conventional computer may also be incorporated into or associated with the test panel to provide a permanent record of test results.

When it is desired to analyze a pressure washer which does not include means for heating the water, then some of the gauges are not required. Similarly, when a pressure washer is not connected to a conventional 110 volt or 220 volt outlet, then the electrical test gauges are not required.

Thus, preferred test panels of this invention include all the test gauges described herein so that such test panels have the broadest utility and the broadest capabilities.

Other variants are possible without departing from the scope of the present invention.

What is claimed is:

1. A self-contained, portable test panel which is adapted to be operably connected to a conventional pressure washer of the type including an electrical system including an electric motor, an exit nozzle for heated water, a water pump which is powered by said electric motor, and heater means for heating water; wherein said test panel comprises a housing which includes:

(a) voltage monitor means adapted to measure electrical line voltage in the electrical system of said pressure washer;

(b) electrical current measurement means adapted to measure current draw by said electric system;

(c) temperature sensing means adapted to monitor the temperature of water exiting said nozzle;

(d) pressure sensing means adapted to monitor the pressure of water exiting said nozzle;

(e) flow meter means adapted to measure the flow rate of water through said pressure washer; and (f) short circuit test means adapted to detect the presence of electrical short circuits in said pressure washer;

wherein said portable test panel is adapted to simultaneously measure the operating parameters of said pressure washer which are measured or monitored by all of the foregoing means.

2. A self-contained test panel in accordance with claim 1, wherein said heater means comprises a combustion heater adapted to burn fossil fuel, and wherein said test panel further includes hydrocarbon test means adapted to measure the air-to-fuel ratio, and the amount of carbon monoxide emitted by said heater means.

3. A self-contained test panel in accordance with claim 2, further including flow pressure sensing means adapted to measure the pressure of said fuel being fed to said heater.

4. A self-contained test panel in accordance with claim 2, further including pressure sensing means adapted to measure the pressure of water exiting said water pump.

5. A self-contained test panel in accordance with claim 2, further including flow meter means adapted to measure the flow rate of chemicals being added to said water flowing through said pressure washer.

6. A self-contained test panel in accordance with claim 2, further including inlet temperature sensing means adapted to monitor the temperature of water entering said water pump; further including ohm-volt meter means adapted to test said pressure washer for electrical continuity and voltage.

7. A self-contained test panel in accordance with claim 2, further including stack temperature sensing means adapted to measure the temperature of combustion gases exiting said combustion heater.

8. A self-contained test panel in accordance with claim 1, further including display means adapted to display said line voltage, current draw, temperature and pressure of water exiting said nozzle, flow rate of water through said pressure washer, and presence of electrical short circuits in said pressure washer.

9. A self-contained, portable test panel which is adapted to be operably connected to a conventional pressure washer of the type including a combustion heater means for water, an exit nozzle for heated water, and a water pump which is powered by an electric motor; wherein said test panel comprises:

(a) voltage monitor means adapted to measure electrical line voltage in the electrical system of said pressure washer;

(b) electrical current measurement means adapted to measure current drawn by said electrical system;

(c) first temperature sensing means adapted to monitor the temperature of water entering said water pump;

(d) second temperature sensing means adapted to monitor the temperature of water exiting said nozzle;

(e) first water pressure sensing means adapted to monitor the pressure of water at said water pump;

(f) second water pressure sensing means adapted to monitor the pressure of water exiting said nozzle;

(g) hydrocarbon test means adapted to measure the air-to-fuel ratio and the amount of carbon monoxide emitted by said heater means;

(h) flow meter means adapted to measure the flow rate of water exiting said nozzle; and (i) fuel pressure sensing means adapted to measure the pressure of fuel being fed to said heater;

(j) flow meter means adapted to measure the flow rate of chemicals being added to said water in said pressure washer;

(k) stack temperature sensing means adapted to measure the temperature of combustion gases exiting said heater; and (l) short circuit test means adapted to detect the presence of electrical short circuits in said pressure washer;

wherein said test panel is contained in an enclosure.

10. A self-contained test panel in accordance with claim 9, further including display means adapted to display said line voltage, current drawn by said electrical system, temperature and pressure of water exiting said nozzle, air-to-fuel ratio, amount of carbon monoxide emitted by said heater means, flow rate of water exiting said nozzle, pressure of fuel being fed to said heater, temperature of combustion gases exiting said heater, and presence of electrical short circuits in said pressure washer.

11. An analyzer system adapted to be operably connected to a conventional pressure washer of the type including an exit nozzle for heated water, a water pump which is powered by an electric motor, and heater means for heating water; wherein said analyzer system comprises test components contained in a housing, said components including:

(a) voltage monitor means adapted to measure electrical line voltage in the electrical system of said pressure washer;

(b) electrical current measurement means adapted to measure current draw by said electrical system;

(c) first temperature sensing means adapted to monitor the temperature of water entering said water pump;

(d) second temperature sensing means adapted to monitor the temperature of water exiting said nozzle;

(e) water pressure sensing means adapted to monitor the pressure of water exiting said nozzle;

(f) hydrocarbon test means adapted to measure hydrocarbons emitted by said heater means;

(g) flow meter means adapted to measure the flow rate of water exiting said nozzle; and (h) short circuit test means adapted to detect the presence of electrical short circuits in said pressure washer.

12. A system in accordance with claim 11, wherein said housing comprises a portable test panel.

13. A self-contained, portable test panel which is adapted to be operably connected to a conventional pressure washer of the type including an exit nozzle for pressurized water, and a water pump powered by an electric motor; wherein said test panel comprises a housing which includes:

(a) temperature sensing means adapted to monitor the temperature of water exiting said nozzle;

(b) pressure sensing means adapted to monitor the pressure of water exiting said nozzle;

(c) pump pressure means adapted to monitor the pressure of water at said pump;

(d) flow meter means adapted to measure the flow rate of water exiting said nozzle;

(e) voltage monitor means adapted to measure electrical line voltage in the electrical system of said pressure washer; and (f) short circuit test means adapted to detect the presence of electrical short circuits in said pressure washer.

* * * * *